United States Patent [19]
Kuepper

[11] Patent Number: 6,103,125
[45] Date of Patent: Aug. 15, 2000

[54] ZERO WASTE EFFLUENT WATER DESALINATION SYSTEM

[75] Inventor: Theodore A. Kuepper, 4907 Marlin Way, Oxnard, Calif. 93035

[73] Assignee: Theodore A. Kuepper, Oxnard, Calif.

[21] Appl. No.: 09/117,057

[22] PCT Filed: Aug. 18, 1995

[86] PCT No.: PCT/US95/10575

§ 371 Date: Jul. 15, 1998

§ 102(e) Date: Jul. 15, 1998

[87] PCT Pub. No.: WO96/05908

PCT Pub. Date: Feb. 29, 1996

Related U.S. Application Data

[63] Continuation-in-part of application No. 08/292,037, Aug. 18, 1994, Pat. No. 5,520,816.

[51] Int. Cl.[7] ...................................................... B01D 61/12
[52] U.S. Cl. ..................... 210/637; 210/137; 210/195.2; 210/257.2; 210/852; 210/805
[58] Field of Search .................................. 210/6, 97, 137, 210/182, 184, 194, 195.2, 257.1, 257.2, 258, 321.6, 649, 650, 652, 739, 744, 805, 110, 637

[56] References Cited

U.S. PATENT DOCUMENTS

| | | | |
|---|---|---|---|
| 3,679,055 | 7/1972 | Clark et al. | 210/257.2 |
| 3,746,640 | 7/1973 | Bray | 210/321.6 |
| 4,626,346 | 12/1986 | Hall | 210/257.2 |
| 5,256,279 | 10/1993 | Voznick et al. | 210/257.2 |
| 5,282,972 | 2/1994 | Hanna et al. | 210/195.2 |
| 5,358,635 | 10/1994 | Frank et al. | 210/257.2 |
| 5,520,816 | 5/1996 | Kuepper | 210/257.2 |
| 5,639,374 | 6/1997 | Monroe et al. | 210/257.2 |

*Primary Examiner*—Joseph W. Drodge
*Attorney, Agent, or Firm*—Marvin E. Jacobs

[57] ABSTRACT

A water desalination and softening system that can be used in a home or commercial environment which recirculates water past a membrane filter element in a manner to self clean the membrane and to prevent a buildup of salts and minerals on the membrane surface. The system conserves water so as to result in near zero waste by recirculating water from a reservoir tank past the membrane. The system can operate in conjunction with a building's water supply and can operate without problems in either a zero or low effluent mode or when water usage is frequent.

15 Claims, 6 Drawing Sheets

ZERO WASTE EFFLUENT WATER DESALINATION SYSTEM

CROSS-REFERENCE TO RELATED APPLICATION

This application is a 371 of PCT/US95/10575, filed Aug. 18, 1995, which is a continuation-in-part of Ser. No. 08/292,037 filed Aug. 18, 1994, now U.S. Pat. No. 5,520,816.

TECHNICAL FIELD

The present invention relates to a water desalination system and method that will provide a continuous supply of treated water while creating zero or near zero waste products. A significant feature of the present design is that it allows zero waste effluent operation without prematurely fouling the desalination membranes being used.

BACKGROUND OF THE INVENTION

It is known to purify (or treat) water through a variety of commercially available water treatment devices designed for point-of-use applications in the commercial/residential water treatment market. The most popular devices are based on the following technologies: activated carbon for organic removal: ultraviolet light disinfection: ion exchange for hardness removal (water softening), and membrane desalination such as reverse osmosis (RO) or nanofiltration (NF).

RO membranes have been used for desalination purposes for over two decades now. However, nanofiltration is relatively new in the field of water treatment technology. A NF membrane produces soft water by retaining the hardness creating, divalent ions present in water. A NF membrane allows a high percentage of monovalent ions such as sodium and chloride to pass through, while it retains a high percentage of the divalent ions. It is the monovalent ions that create osmotic pressure that requires the moderate to high pressures necessary to pump water through an RO membrane. Therefore, nanofilter membranes require much less pressure to pump water through the membrane because hydraulic driving force does not have to overcome the effect of osmotic pressure from monovalent ions. Generally speaking, RO membranes used for residential and commercial water treatment applications remove all dissolved solids by approximately 98%. while nanofilter membranes remove divalent ions (hardness components: calcium and magnesium) by approximately 90% and monovalent ions (sodium chloride) by approximately 50%.

Desalination devices that use membrane elements (for example: RO or NF) always create two streams of water as the water exits the element: desalinated product water (which has passed through the membrane), and a waste brine (that has flowed across the membrane surface). This waste brine stream is necessary to flush salts and minerals away from the membrane to prevent them from accumulating and fouling the membrane surface. If a buildup of salts and minerals in the feed-water to a membrane occurs continuously, dissolved substances can precipitate and form a solid film fouling the surface of the membrane. In addition, colloidal and particulate contaminants can also adhere to the membrane surface and cause fouling. With many waterborne contaminants, if a membrane becomes irreversibly scaled, or fouled, it can't be cleaned and must be replaced. This characteristic of membrane processes poses a significant problem in reducing waste effluent especially in point of use (POU) water treatment systems that are typically compact and built as economically as possible.

Ion exchange devices are also used to soften so called "hard water". The problem with ion exchange water softening systems is that they remove the hardness components of water (calcium and magnesium ions) by exchanging them for sodium ions in order to create what is called "soft water". When regeneration of the ion exchange media takes place, a concentrated water stream of sodium, chloride, calcium and magnesium ions goes into the sewer system creating an environmental waste disposal problem.

In a conventional residential or home RO water treatment system, the standard ratio of water wasted to water produced is approximately 5 to 1, or 5 gallons wasted for each gallon produced. However, this is only if the product water goes to atmospheric pressure after exiting the RO module. The ratio is routinely 10 to 1, and can be much higher, in systems containing an air captive storage tank to store RO product water. This form of tank exerts a back pressure that restricts water flux through the RO membrane as the tank is filling (while waste brine continues to flow freely to drain). Therefore, an appreciable amount of water is normally wasted with a conventional home RO system.

STATEMENT OF THE PRIOR ART

There have been several attempts to design desalination systems that provide reduced or zero brine effluent. Bray (U.S. Pat. No. 3,746,640) is concerned with reducing brine in a small RO system. Brine concentrate ("blowdown" water) from the system is disposed of to a pressurized water supply pipe by taking advantage of "low" pressure surges when a faucet (or other fixture) connected to one of the water supply lines (either hot or cold), is opened.

The system described by this patent has several problems: One problem is that the membrane does not get cleaned enough to operate properly. Most water distribution systems in buildings are designed to not allow pressure surging when a fixture is opened. Therefore, the pressure differential between the hot and cold lines may be zero. Without a pressure differential, no water would flow through the element to clean it. Another problem is that in one configuration, the system would allow hot water to flow through the RO element. Hot water above 90° F. will damage most membranes. Bray admits that the system will not operate satisfactorily in an installation where there is only an infrequent use of water.

The Bray system would produce product water with a very poor quality because there is not much driving force across the RO membrane at any time. Salts accumulating inside the RO element will increase osmotic pressure and will decrease water passage through the membrane. Salts will actually increase going through the membrane since salt passage is a function solely of the salt transfer coefficient of the particular membrane used and the concentration of salt at the membrane surface. If the membrane is not kept clean by moving feed/brine water through the membrane element continuously while it is making product water, salts will build up quickly and will scale the membrane surface while decreasing product water flow through the membrane and increasing salt passage through the membrane. Therefore water quality will be very poor and membranes will foul prematurely with this system.

Hall (U.S. Pat. No. 4,626,346) discloses a water desalination system containing its own limited supply of water. Such systems would find use in motor homes, recreational vehicles (RV), boats, etc. that contain a storage tank, but would not be permanently connected to a pressurized water supply. The water storage tank is filled periodically with water and water fixtures feed off the tank water until the tank requires refilling.

In the Hall system, purified, drinking water is produced and is directed to an outlet 64. A second outlet for untreated water for flushing toilets, showers, etc. is connected to the line from the supply tank that feeds the RO element. RO waste water or brine is recycled to the supply tank and mixes with the supply water.

A problem with the Hall design is that as water is used by water fixtures, the amount of water contained inside the storage tank decreases. As water in the storage tank decreases, the dilution effect of RO element feed-water recirculated from/back to the tank also decreases. As this happens, salts and minerals will build up in the tank. This will damage the RO membrane in time, depending upon the amount of water left in the storage tank and the original salinity of the supply water.

In the Hall design, connecting to a pressurized line water will not help to clean the water treatment membrane since all water purification systems designed for recreational vehicles and boats place a check valve between the water supply tank and the inlet for the pressurized line water in order to isolate the supply tank from a pressurized water source. In this way, water supply systems designed for RV's and boats specifically by-pass the storage tank when they're hooked to a pressurized water source. Therefore, the Hall patent design would not allow dilution of the salts and minerals accumulating in the water storage tank (due to the RO water purifier) when a RV or boat is hooked up to a permanent supply of pressurized water. In addition, in several places, the Hall patent specifically states it is designed for a "limited and exhaustible water supply" and not a continuous supply of water.

The focus of the Hanna patent (U.S. Pat. No. 5,282,972) is to design a water purification system for a building that produces very little waste water. The Hanna design takes water coming into a building, recirculates it through an RO element, and pumps the brine/concentrate water back to the water supply line where the water came from in the first place. It also uses rather sophisticated control features to by-pass the RO element to better flush/clean the RO membrane and to periodically depressurize the RO element. There is no suggestion of use of a supply or recirculation tank to receive the recycled waste water.

The fundamental functional problem with the Hanna patent design is the fact that the RO element waste brine is recirculated directly into a building's water line. Conventional water lines feeding a building are about ¾ inch in diameter and a building's internal water lines are often ½ inch diameter. Unless the water line is used continuously, salts and minerals in the water line will concentrate rapidly as the RO element is used and will cause scaling (and fouling) damage to the membrane. There is virtually no dilution of salts and minerals attained by recirculating RO element brine waste through a ¾ inch water line. The water line must be used continuously to receive a dilution benefit. A continuous use of a RO system's feedwater is a very unrealistic expectation in a commercial building or residence and consequently makes the Hanna patent design very location dependent. In fact, in most buildings the Hanna patent design will fail to keep the RO membrane design clean and RO elements will have to be replaced prematurely. The present invention's systems use a recirculation tank to keep salts and minerals in a diluted solution for an extended period of time so the water purifying membranes are not fouled or scaled. The Hanna patent uses no recirculation tank and discharges directly to the water line.

SUMMARY OF THE INVENTION

The present invention is directed to a water desalination and/or softening system that can be used in a home or commercial environment which uses a membrane element that is self-cleaning to prevent a buildup of salts and mineral on the membrane surface. The system uses the dynamics of water usage in a building to periodically flush a recirculation/reservoir tank that feeds the water treating element's membrane. The system also produces no waste effluent that must be dumped into a sewer system, thereby preventing wasting water and causing environmental pollution.

The system of the present invention operates in a zero or low effluent mode with out suffering membrane damage (especially scaling) due to low (or no) flow of a building's water supply during the time when the system is actually operating.

Unlike the Bray system and the Hanna system, the zero effluent systems of the present invention work very well when water usage in a building's water supply is infrequent. The recirculation tank takes up the slack to allow the membrane purification system to operate even though no water fixtures in a building are being used. It is unrealistic to design a water purification system that absolutely depends upon the use of a building's water supply while the water purification system is operating in order to prevent membrane damage. With the present invention, as long as water is used only once within 24 hours in order to dilute the recirculation tank, there will be no membrane damage. Membrane damage can also be avoided by draining a portion of the brine during long periods of non-use of the water supply system.

The systems described in the present invention are very "forgiving" and prevent membrane damage (especially scaling) problems in the long term. The system can operate with a permanent water supply in a zero or low effluent mode without suffering membrane damage due to low or no flow of a building's water supply during the time the membrane purification system is operating. This is unlike the Hall system which will not work well if water usage is frequent. In the Hall system, as water is used, the volume of water in the storage tank which is used to feed the RO system will deplete. This will concentrate the salts and mineral in the water supply tank that the RO system is already concentrating. Unlike the Hall patent, the zero effluent systems of the present invention will work best when water usage is frequent.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
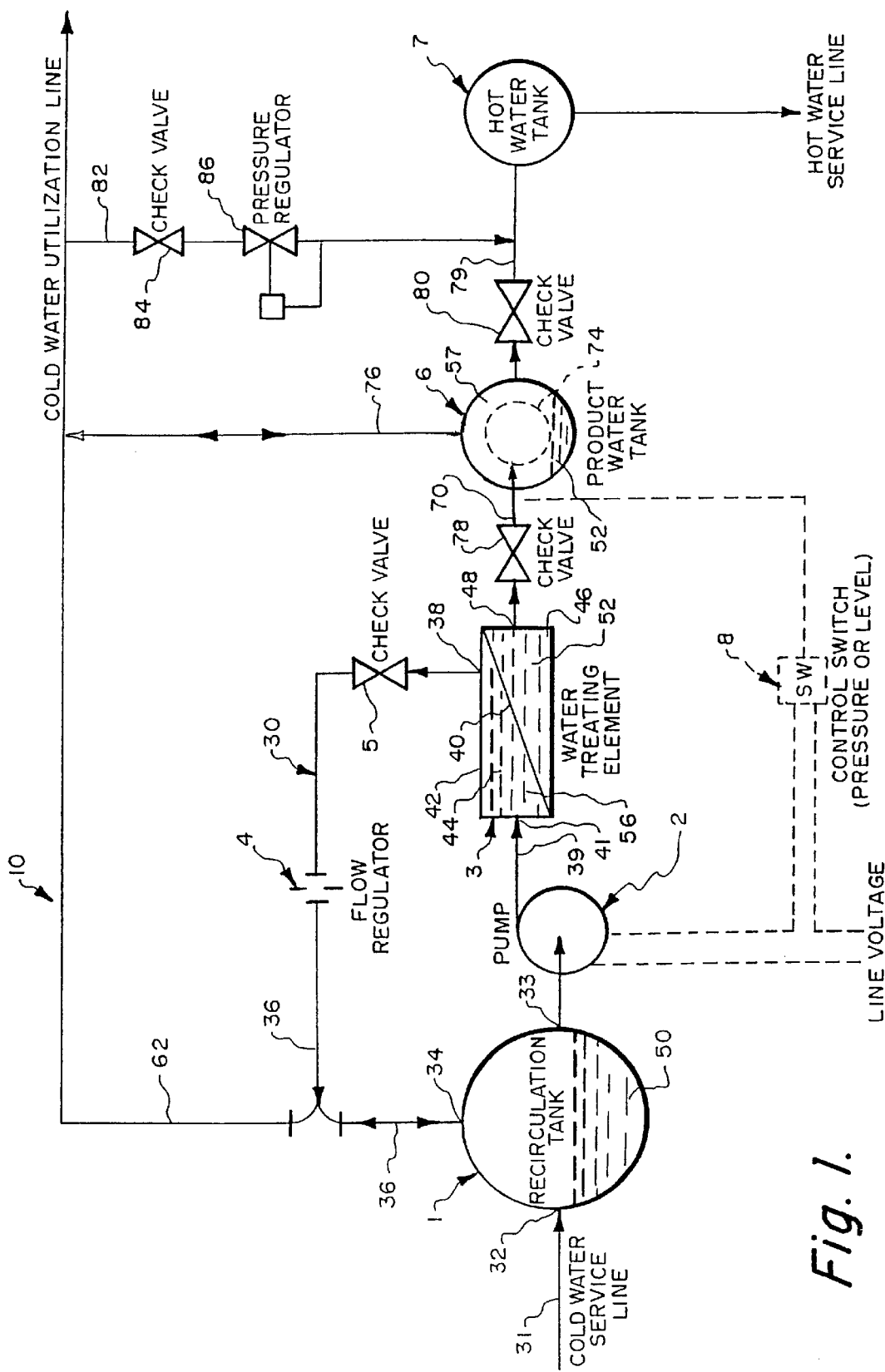
FIG. 1 is a schematic view of a the basic zero effluent water treatment system using a self-cleaning water treating membrane element. The product water configuration shown is one that provides softened water to a hot water tank.

The water treatment system of the invention operates by delivering cold input water having a first salt content as well as higher salt content waste water rejected by a water treatment element to a reservoir tank to form a mixture having a salt content intermediate the inlet water and the waste water and passing water through the membrane to produce desalinated product water. A water utilization line is also connected to the tank. As water is utilized, supply water enters the tank dilutes the water in the tank and flushes the mixture water from inside the tank into the utilization line.

The basic system 10 includes a water treatment unit 3 and a recirculation tank 1 connected in a closed loop 30. The loop 30 can also contain a pump 2 and a switch 8 for periodically operating the pump 2. The unit 3 contains a water treatment element 40 in a housing 42 dividing the interior of the housing into a first compartment 44 and a second compartment 46. A low salt content product water output 48 is connected to the second compartment 46.

The recirculation tank 1 contains a cold water service line (CWSL) 31 connected to inlet 32 and a waste water inlet 34 connected by a line 36 to the outlet 38 from the first compartment 44 of the water treatment unit 3.

When the pump 2 is activated by the switch 8 the water 50 in the tank 1 is pumped out of the tank through outlet 33 through line 39 into the inlet 41 to the first chamber 44. A portion of the water, usually 5–10%, flows through the membrane 40 to form low salt product water 52 which collects in the second compartment 46. Salt, rejected by the membrane 40, collects on the surface 54 of the membrane 40. The high salt content waste water 56 in compartment 44 is pumped out outlet 38 through line 36 and inlet 34 into the tank 1.

The inlet 34 to recirculation tank 1 can also serve as a service water outlet when the tank 1 is connected to a water utilization line 62. The line 62 can be used for all water utilization purposes or for the limited purposes of flushing, showering, washing clothes, etc. The line 62 is normally closed. When line 62 is opened, input water enters tank 1 through inlet 32, mixes with the recirculated waste water 50 and flushes the contents of tank 1 out of the tank 1 through outlet 34 into the utilization line 62. Check valve 5 may be used to prevent water from entering the loop 30 through line 36. A flow regulator 4 can also be inserted into the recirculation line 36 if pressure must be increased above normal water line pressure.

The water treating unit 3 contains a water treatment element 40 which rejects ions or permits water to pass through the element without ions and/or absorbs ions. The element can be a solid such as a polymeric film, a gel such as a carbon aerogel or ion exchange resin. The water treatment element provides separation of water impurities from supply water to form purified water. In this regard, water treating element can comprise any configuration of water purification medium including a membrane element, such as, but not limited to, tubular, spiral wound, hollow fiber, and plate and frame element configurations. In addition, if a particular building does not have sufficient water usage to maintain a zero effluent system, a minimal effluent water treatment system could also be configured with a relatively small amount of effluent going to drain. In this case, the system of the invention would minimize the amount of waste water that would have to go to drain. Also, it must be recognized that although a water treating element containing a membrane is described throughout this invention disclosure, this invention also is applicable to a water treating element that may not use a membrane to separate water impurities and purified water such as a carbon aerogel or electro deionization process.

A purified water outlet 48 can be connected to a product water storage tank 6 by means of a line 70 containing a check valve 78. The control switch 8, monitors pressure in the product water storage tank 6, after check valve 78, if it is a pressure switch. If the pressure in the tank 6 increases to a preset limit, pump 2 shuts off. If control switch 8 senses pressure below the preset pressure, pump 2 is turned on and water is pumped through water treating unit 3, through check valve 5, and then back to the recirculation tank 1. If switch 8, is a level control switch, it is connected to the product water storage tank 6. In this case, control switch 8 will turn pump 2 on and off in a similar way as described for the pressure switch when the product water storage tank 6, is full. In addition, other methods known in the RO industry may be used to turn pump 2 on and off, as required. As water is pumped through the recirculation loop (tank 1, pump 2, water treating unit 3, check valve 5 and flow regulator 4), water is flushed past the membrane (or other media) surface in the water treating unit which reduces the concentration of salts and minerals on the membrane (or other media) surface 54 at the same time water is being pushed through the membrane 40 to create purified product water.

After passing through the membrane 40 contained inside water treating unit 3, the product water passes through line 70 containing a check valve 78, and then flows to a product water storage tank 6. The particular product water configuration shown in FIG. 1 can provide softened water to a hot water tank.

In the product water section shown in FIG. 1, softened product water 52 inside storage tank 6 feeds the building's conventional hot water heater, tank 7 through a line 79 containing a check valve 80. In operation, this system creates no waste brine because effluent from the water treating unit 3, is recirculated back to the recirculation/reservoir tank 1. Tank 1 being connected in the CWSL 31 dilutes the input water whenever water is used in the building (such as when a faucet is opened). This embodiment is designed to soften all water used by the hot water line in a building. By softening only the hot water, a very efficient system is created because it is the hot water that is used most frequently with devices that require soft water, such as showers, dishwashers, and clothes washing machines. In addition, this system prevents scale buildup in the hot water lines of a building by removing scale-forming substances before the water is heated. However, this same system could be used to soften all the water used in a building with the configuration described in FIG. 4, or if a waste stream is allowed to drain to the sewer.

In addition to control 8, that turns on pump 2, when water has been removed from the product water storage tank, a bypass line 82 (including a check valve 84 and pressure regulator 86) is necessary to allow untreated water to enter the hot water heater if the softening treatment system cannot keep up with hot water demand. However, the product water storage tank 6, can be sized to accommodate typical demands placed on the hot water service for a building.

Figure 2:
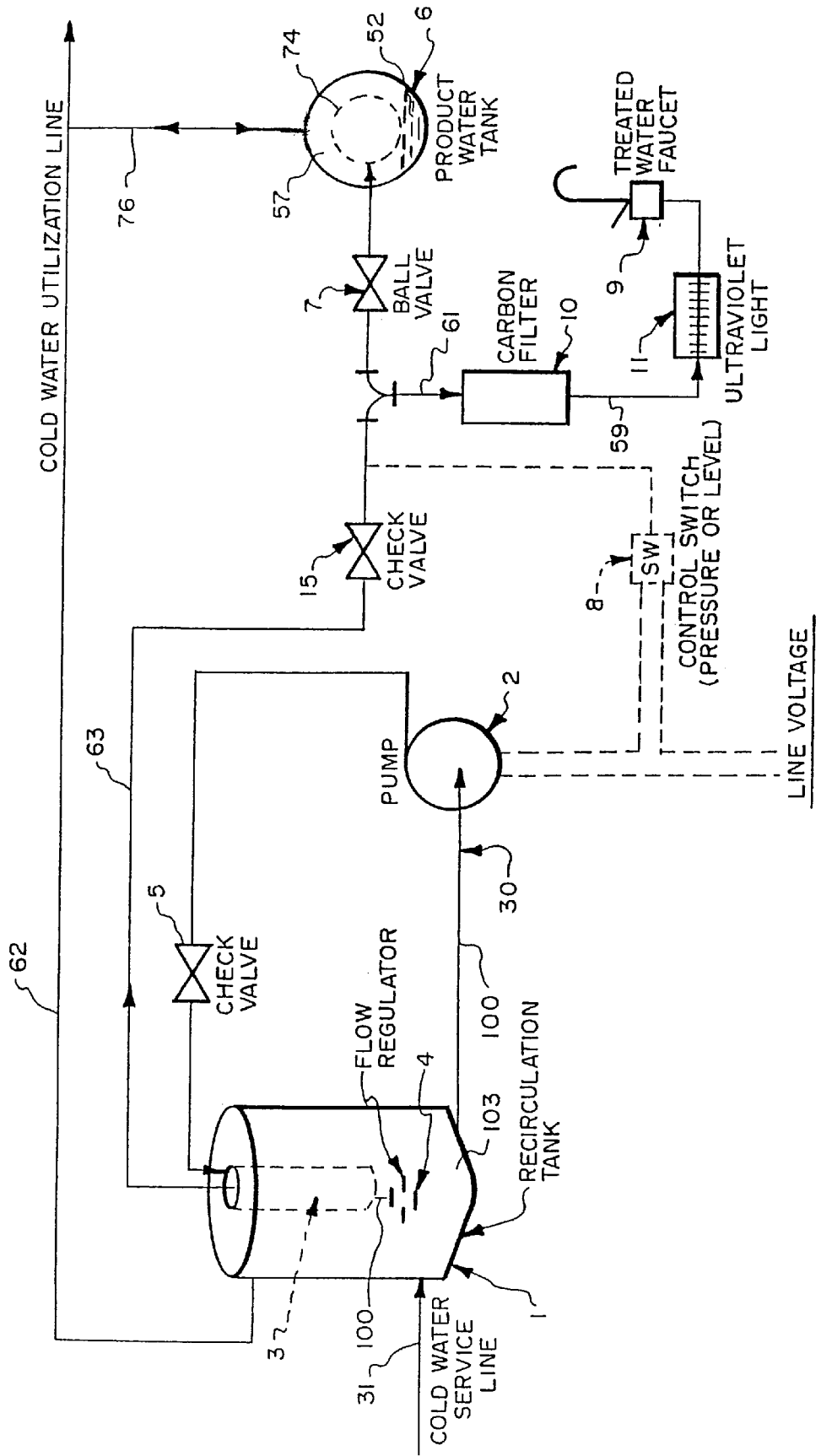
FIG. 2 is a schematic view of a basic zero effluent water treatment system using a self-cleaning water treating membrane element in which the element is incorporated inside a water recirculation/reservoir tank. The product water configuration shown is one that provides desalinated water to a drinking water storage tank.

However, the water treatment system shown in FIG. 1 could also produce treated water for a drinking water application as is depicted in the product water section of FIG. 2. The product water storage tank 6 may contain a flexible bladder 74 which receives pressurized cold water from the branch line 76 which is connected to cold water utilization line 62. As the bladder 74 expands, it pushes product water 52 out of the annular water chamber 57 in tank 6. This will occur whenever a fixture (such as a faucet) attached to the product water line is opened, thus reducing pressure in the product water line. This type of tank is now used in the residential RO industry and is known as a "water on water" tank. In addition, other types of product water tanks, such as pneumatic bladder tanks and unpressurized, pump assisted bladder tanks, are now used as product water tanks in the residential RO industry. Any of these tanks may be used to store product water in the system of the invention.

While the term "faucet" is used, it should be understood that this is merely for convenience, and any type and any number of water fixtures may be inserted into the water lines. For example, clothes washing machines, dishwashers, toilets, showers/tubs, and any other standard devices could be installed at the "faucet" locations.

Normal water service to a building comes through the cold water service line (CWSL) 31. The system of the invention above can be hooked up anywhere in the CWSL to a building. However, a typical place for the recirculation tank 1, to be installed would be in the cold water line prior to where the line "tees off" to feed a hot water tank. Another typical location would be under a sink (not shown) in a location where a treated product water faucet is desired.

If tank 1, is placed in the CWSL 31 entering a building, maximum flow through tank 1, can be expected as building occupants use water fixtures such as faucets, as well as toilets, showers, washing machines, and dishwashers. Therefore, no appreciable buildup of total dissolved solids (TDS) such as salts and minerals would be expected to occur and the recirculation process will operate most effectively.

If tank 1, is placed in the cold water line under a sink or an infrequently used water line, that particular cold water faucet must be used occasionally for example, once a day if product water 52 is removed from product water tank 6, to prevent a buildup of TDS in tank 1. The fact that tank 1, represents a water reservoir of multiple gallons of feedwater, reduces the concentration of dissolved salts and minerals in contact with the surface of the element 40 such as a membrane in water treating unit 3. The more water used by fixtures attached to the CWSL, the smaller tank 1, must be. If water is not used routinely through the CWSL, then tank 1, must be sized larger to accommodate the concentration of salts and minerals as water is desalinated and produced.

FIG. 2, illustrates a second embodiment of a zero effluent desalination system. In FIG. 2, the salt and mineral separation unit 3, is positioned in a vertical orientation inside tank 1. As in FIG. 1, a recirculation loop 30 consisting of a pump 2, a check valve 5, and the separation unit 3, are used in the same manner as in FIG. 1. A flow regulator 4, can be positioned in the brine discharge outlet line 100 of the unit, as an option if a pressure boost above normal line pressure is required. Cold water from the CWSL 31 enters tank 1, and exits through water utilization line 62 to feed the fixtures attached to the line 62. As described in the FIG. 1 system, whenever cold water is removed from line 62, the water 103 in tank 1 from the unit 3 (with its accumulated salts and minerals) is diluted and flushed away as the input water from CWSL 31 flows through recirculation tank 1. The low salt product water which passes through the membrane leaves the separation unit through line 63 and passes through check valve 15, ball valve 7 and accumulates in the annulus 57 of product water tank 6. Likewise, the recirculation loop 30 also reduces the concentration of salts and minerals near the surface of the membrane by flushing through the unit 3. The components in the product water section shown in FIG. 2, are conventional and typical of a membrane-based drinking water treatment system and include: a treated water faucet 9, a "water-on-water" product water storage tank 6, a carbon filter 10, and an ultraviolet light 11. The bladder 74 is pressurized by branch line 76 which connects the bladder 74 to the cold water utilization line 62. The product water 52 moves through ball valve 7 through line 61, carbon filter 10 and ultraviolet light 11 whenever faucet 9 is open. It should also be recognized that in the system described in FIG. 2, tank 1 may act as a pressure vessel for the unit 3 depending upon the particular membrane configuration used (for example, tubular or hollow fiber). A casing need not be used to encase the tubes or hollow fibers.

Figure 3:
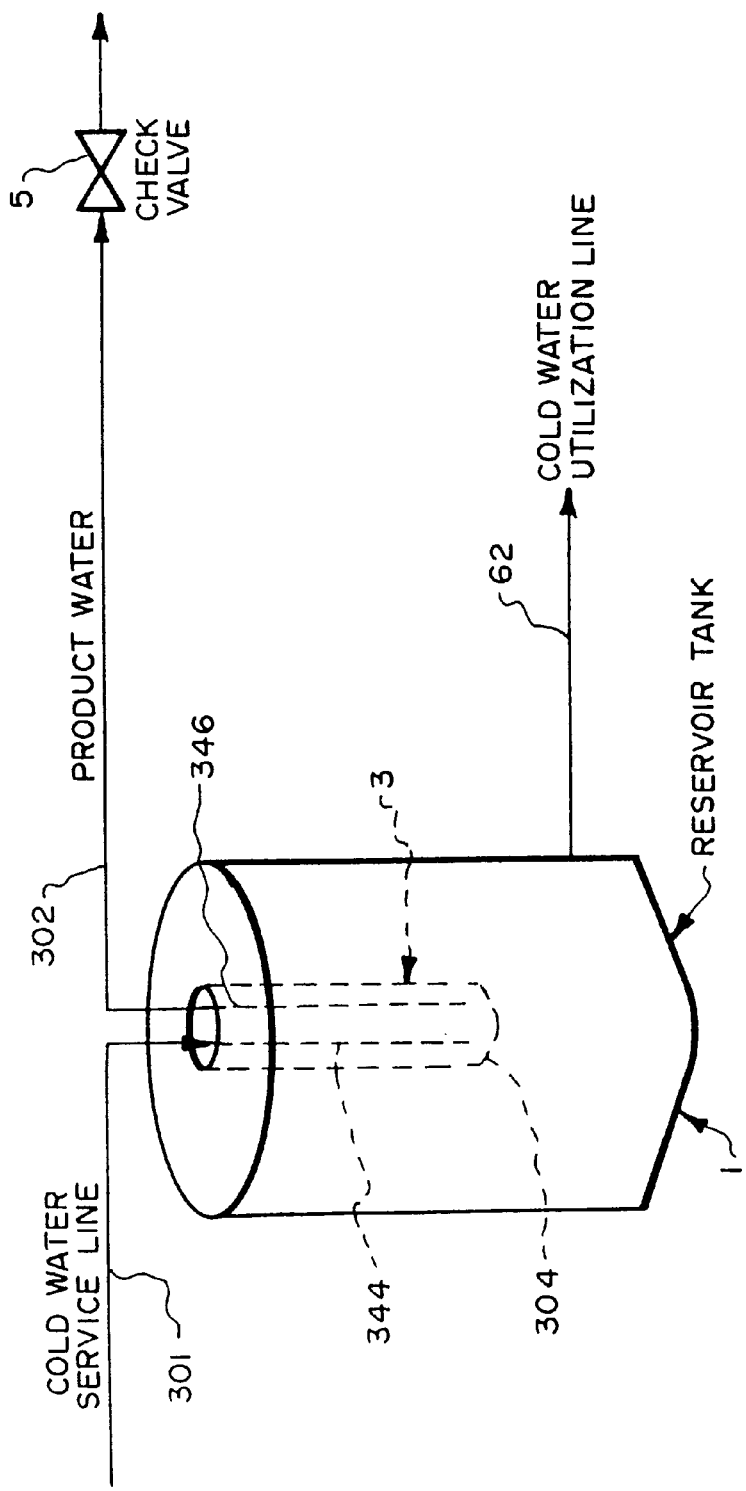
FIG. 3 is a schematic view of the basic zero effluent water treatment system using a self-cleaning membrane element in which the treatment unit is incorporated inside a water reservoir tank without the need for a pumped recirculation flow pattern.

FIG. 3 is another embodiment which shows the separation unit 3, positioned in a vertical orientation inside tank 1. As can be seen in FIG. 3, a pumped recirculation loop is not used. Instead, the CWSL 301 enters tank 1, through the separator unit 3 and high salt content water exits the unit 3 through outlet 304 into the tank 1. Product water leaving the compartment 346 from unit 3 and connects to product water line 302 through outlet to feed the water fixtures and appliances, not shown. As in the discussion of FIG. 1, whenever the cold water in CWUL 62 is used, feed-water to the membrane element 344 in unit 3 flushes away accumulated salts and minerals into the water in tank 1 and the diluted mixture exits CWUL 62. In this embodiment, however, the flushing action through the membrane element 344 is far greater than that of the embodiments of FIG. 1 or FIG. 2, because every time water flows in the utilization line 62, water from CWSL 301 flushes directly past the membrane surface through element 3. For those membrane element configurations that do not use feed/brine spacers, such as hollow fiber and tubular, the CWSL inlet 301 to tank 1 will be as close to the membranes as possible to maintain a flushing action. Surrounding the hollow fiber and tubular configurations by a multiple of gallons of water will provide dilution of salts and minerals at the membrane surface that will be further diluted whenever water fixtures attached to the CWUL 62 are used. It should also be recognized that in the system described in FIG. 3, tank 1 will act as a pressure vessel for the membrane element depending upon the particular membrane element configuration used (for example, tubular or hollow fiber).

The components in the product water section of FIG. 3 would be similar (or identical) to those shown in FIG. 1 or FIG. 2.

Figure 4:
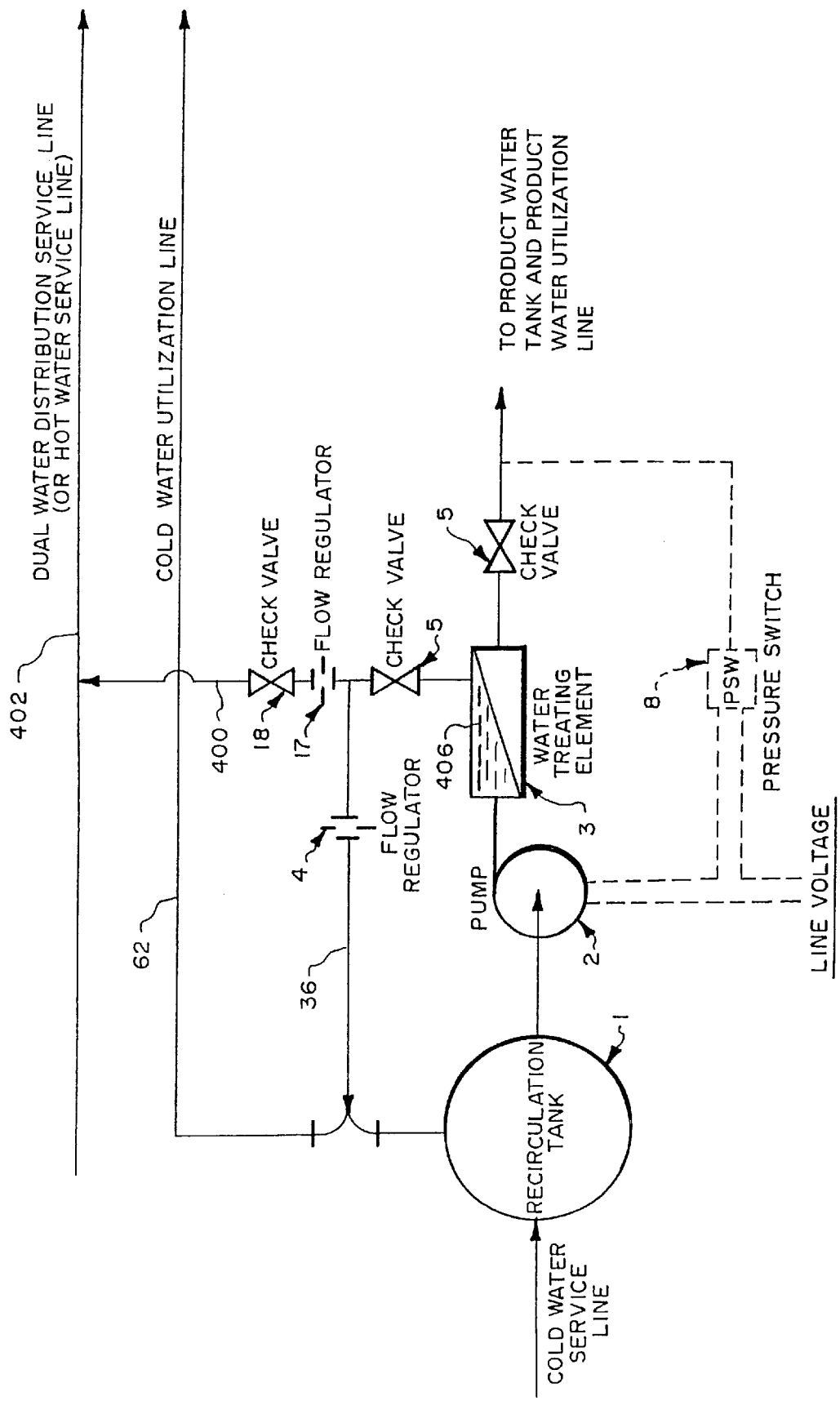
FIG. 4 is a schematic view of an embodiment of a water treatment system similar to the embodiment of FIG. 1, which incorporates a flow regulator and check valve to allow a portion of the effluent from the water treating membrane element brine to be discharged into a dual water distribution service line (or a hot water service line)

Another option is to add an additional line 400 from the recirculation loop to a hot water service line 402 or dual water distribution line, as shown in FIG. 4. A dual water distribution line contains a separate line for toilet flushing and other related water fixtures, separate from the potable drinking water fixtures. The additional line 400, shown in FIG. 4, includes a flow regulator 17, and a check valve 18. When pump 2 operates, flow regulator 17 allows a percentage of the overall flow to exit into the additional water line 400. In this way, a buildup of TDS in the recirculation loop is avoided if the CWSL is not used and a zero waste effluent system is maintained. It should also be recognized that if a zero waste effluent system is not required, the water exiting check valve 18, could go to a drain line. The "waste" brine entering the hot water service line (or dual water distribution line) blends with water sitting in the line and becomes part of the water consumed when the water line is operated (again, maintaining a zero effluent operation).

In addition, a pump 2 may be operated to pressurize the RO element brine 406 above the normal pressure in hot water line 402 (or in dual water distribution line). An alternative to this is to reduce the pressure of the hot water line (or dual water distribution line) with a conventional device such as a water pressure regulator. This would reduce, and in some cases, eliminate the necessity for pump 2.

Figure 5:
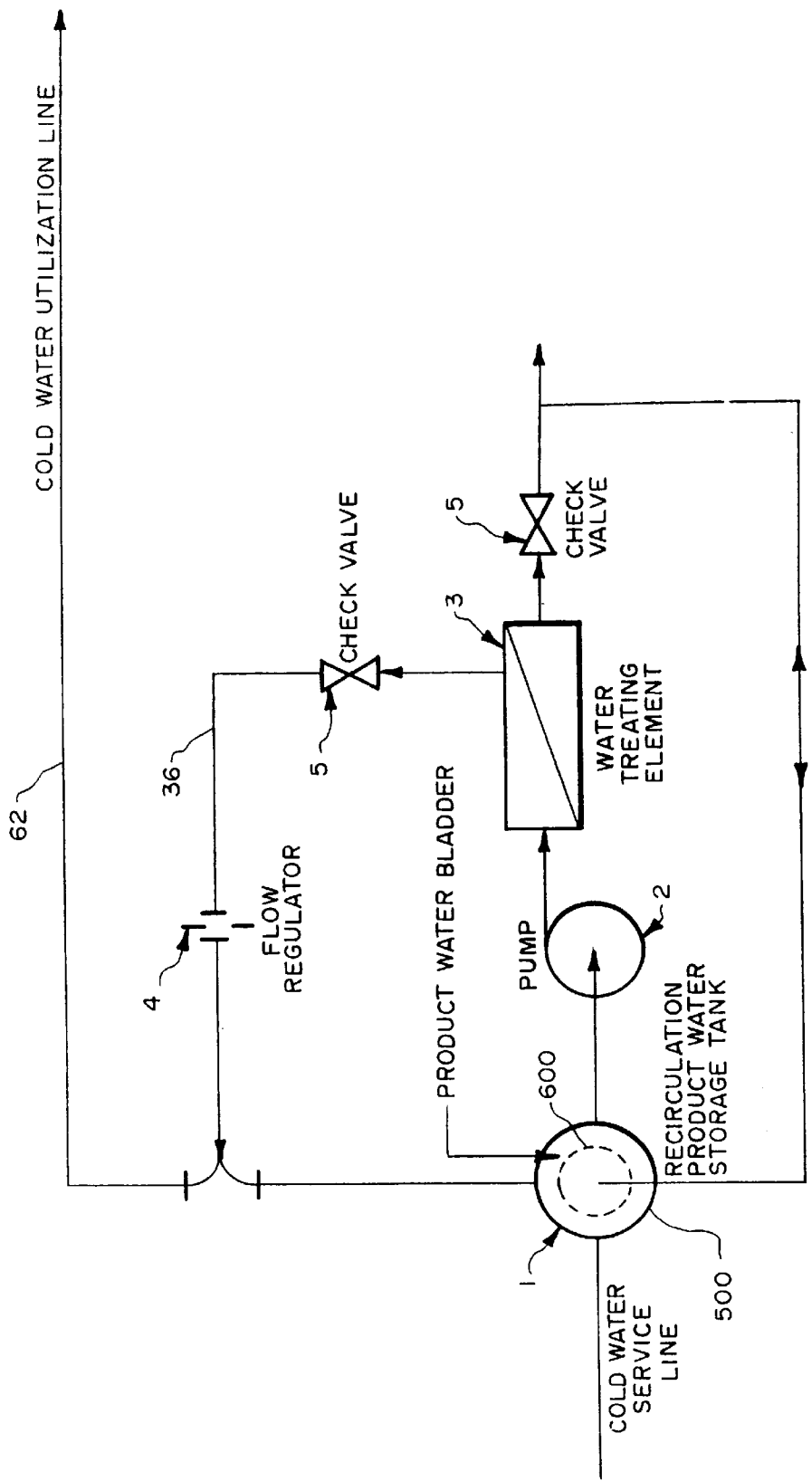
FIG. 5 is a schematic view of another embodiment of a water treatment system similar to the embodiment of FIG. 1 which shows one combination recirculation/product water storage tank used instead of two separate tanks used for recirculation and product water storage.

FIG. 5 shows a modification to the product water section configurations described in FIG. 1 and FIG. 2. In FIG. 5, the separate product water storage tank 6 has been replaced with a combination recirculation/product water storage tank 500. The function of tank 500 as a recirculation and water reservoir tank is exactly the same as the tank 1 descriptions used in FIG. 1 and FIG. 4. The advantage to using one tank as a combination recirculation/product water storage tank, instead of two tanks, will be evident from the discussion describing FIG. 6.

Figure 6:
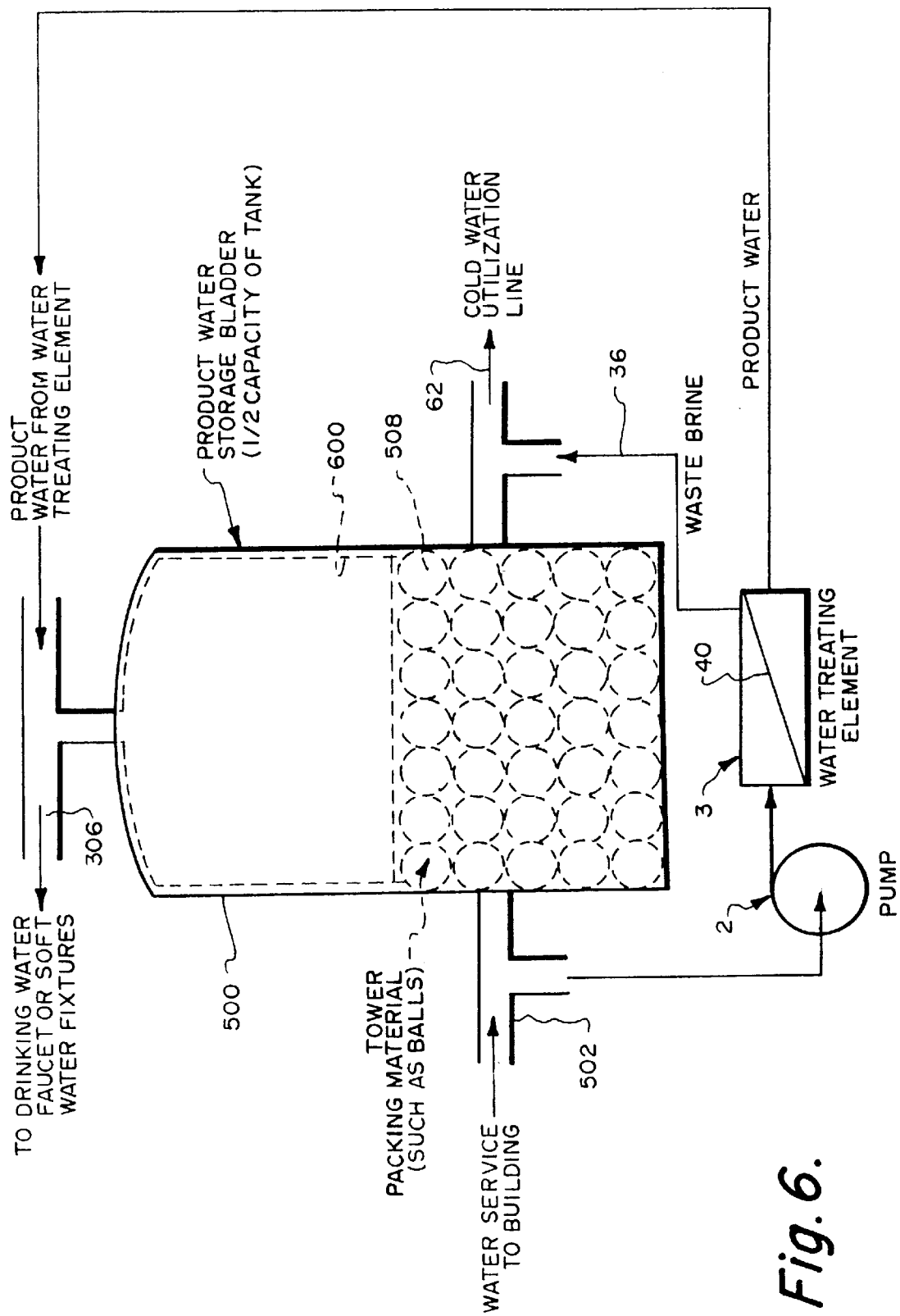
FIG. 6 is a detailed schematic view of the combination recirculation/product water storage tank shown in FIG. 5.

FIG. 6 shows a single tank 500 that combines the function of a recirculation tank and a product water storage tank. Water storage tanks routinely used to store and pressurize product water from small water treatment systems today, use either a pressurized air-filled chamber (bladder) to make a hydro-pneumatic tank, or a pressurized water-filled chamber (bladder) to make what's commonly called a "water-on-water" tank. In either case, pressurized air or water is used to push product water out of the tank. The "water-on-water" tank is a particularly good configuration because you can get all of the product water out of a tank when it's being pushed out with water-line pressure (for example: 60 psi). Hydro-pneumatic tanks use an air bladder pre-charged with 5 to 10 psi to keep some pressure on the product water inside a tank as it is exiting. However, a 4 gallon hydro-pneumatic tank will only dispense about 2 gallons of water (at best), while a 4 gallon "water-on-water" tank will dispense all 4 gallons. Therefore, a "water-on-water" tank is a more efficient design.

The combination recirculation/product water storage tank 500 shown in FIG. 5 and FIG. 6 acts as the recirculation tank described in FIG. 1 and FIG. 4 with the cold water service line 502 to a building going through the tank. As such, the tank water is kept at line pressure—for example 60 psi. However, the tank also contains a bladder 600 that is used for product water storage. It will receive product water from the water treating unit 3 and will dispense product water out at line pressure (for example 60 psi) through line 306 since CWSL water from line 502 is squeezing the bladder 600.

Placing the product water bladder 600 inside a recirculation tank 500 is unique and beneficial. The product water bladder must be smaller than the recirculation tank so there's always room for recirculation water even if the product water bladder is full. As an example, for an "under the counter" water treatment design, a combination recirculation/product water storage tank could use a 4 gallon tank with a 2 gallon bladder. For a home water softening system, an 80 gallon tank with a 40 gallon bladder could be used. Tower packing material 508 (very open, large void design) can be used to take up the void under the bladder 600 so when the bladder is full, it doesn't over-extend itself. Recirculation water from line 36 can easily flow through the tower packing material without creating a measurable pressure drop. As an added advantage, the tower packing material creates mixing and consequently diffusion of salts and minerals as the water treatment system operates (especially useful when no water is being used in the building). It should be recognized that there are a variety of other materials that can be used to fill the void of the recirculation portion of the tank or create a baffle to support the bladder Referring again to FIG. 5 and FIG. 6, at system start-up (assuming an 80 gallon tank), the product water bladder 600 will be collapsed, maximizing the volume of the recirculation portion of the tank (80 gallons). As product water fills the bladder, the water in the recirculation portion will be pushed out of the tank to make room for the expanding bladder Using one tank to accomplish two functions allows one to use a tank of less volume then the addition of the volumes of the two original tanks. For example—a membrane-based softening system (shown in FIG. 1) would use two 50 gallon tanks because a 50 gallon recirculation/reservoir volume is needed to provide the dilution to produce 50 gallons of product water when water fixtures are not being used inside a building. When the functions of the two 50 gallon tanks are combined, one 80 gallon tank can be used to accomplish both water recirculation/reservoir tasks and product water storage tasks. Likewise, an "under the counter" RO system using the system shown in FIG. 1 or 2 would use two 4 gallon tanks because a 4 gallon recirculation/reservoir volume is needed to provide a dilution to produce 4 gallons of product water when water fixtures are not being used. When the functions of the two 4 gallon tanks are combined, one 4 gallon tank is all that's needed to accomplish both tasks.

Using a combination recirculation/product water storage tank also provides a self-correcting feature in that when the water treatment system needs to produce the maximum amount of water (for example when the product water bladder is empty), the treatment system has the maximum volume in the recirculation/feed tank. Using the home softening system as an example: with an 80 gallon tank containing a 40 gallon product water bladder, if the recirculation pump is operating when the product water bladder is completely empty, there's 80 gallons in the recirculation portion of the tank to maximize the recirculation feedwater's dilution factor.

In terms of an under-the-counter home RO system, a 4 gallon tank may be used as a recirculation tank and a 4 gallon hydro-pneumatic tank can be used as a product water storage tank. This provides a 1:1 dilution factor (4 gallons recirculation water volume to 4 gallons product water storage volume). With a combination recirculation/water storage tank, only one 4 gallon tank is necessary to do everything. The product water bladder is sized to hold 2 gallons while the recirculation portion of the tank is 2 gallons. When the product water bladder is empty and the water purification system needs to produce the maximum amount of water, the recirculation tank holds 4 gallons for maximum dilution of recirculating salts and minerals. When full, the product water storage portion of the tank will hold 2 gallons of product water providing a 2:1 dilution factor (4 gallons recirculation water volume maximum to 2 gallons product water storage volume).

The combination recirculation/water storage tank acts as a normal recirculation tank with water service to a building going through the tank. As such, the tank water is kept at line pressure—for example 60 psi. However, the tank also contains a bladder that is used as product water storage. It will receive product water from the zero effluent RO and/or softening system and will also dispense the water out at line pressure (for example 60 psi) since line pressure water is squeezing on the bladder.

Although the zero effluent systems, and the method of using the same according to the present invention have been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A desalination system consisting:

a service water line receiving municipal water under pressure for connection to a first service water inlet;

a water treatment unit containing a housing, a water treatment element dividing the housing into a first chamber for receiving feed water and for retaining the salts and minerals in the feed water that do not pass through the unit and a second chamber for receiving desalinated produced water;

a feed water inlet connected to the first chamber;

a waste water outlet connected to the first chamber;

a desalinated product water outlet connected to the second chamber;

a rigid tank having an interior chamber and a flexible hollow product water bladder dividing the interior chamber into a recirculation compartment and an adjacent product water compartment, the flexible bladder being responsive to the pressure of water in the recirculation compartment for dispersing product water therefore the recirculation compartment having said service water inlet, a waste water inlet connected to said waste water outlet, a water utilization outlet and a feed water outlet connected to the first compartment of the water treatment unit;

the product water compartment having an inlet connected to the desalinated product water outlet;

a water utilization line containing a faucet or other water utilization appliance connected to the water utilization outlet of the recirculation compartment;

the recirculation compartment and its inlets and outlets being constructed and arranged that in response to water being periodically utilized by said faucet or other appliance, service water under pressure is caused to enter the recirculation compartment through the service water inlet and mix with and dilute waste water from the first compartment of the water treatment unit from a dilute mixture which leaves said recirculation compartment through said water utilization outlet.

2. A system according to claim 1 in which the element is a membrane.

3. A system according to claim 2 in which the membrane is a reverse osmosis or nanofilter membrane.

4. A system according to claim 3 in which the flexible bladder divides the rigid tank into a central water storage compartment and an annular recirculation compartment.

5. A system according to claim 1 further including a pump in the fluid connection coupling the first outlet from the tank to the inlet to the first compartment of the water treatment unit.

6. A system according to claim 1 in which the water treatment unit is disposed within the first tank.

7. A system according to claim 1 further including a volume or pressure sensor developing a signal connected to a storage tank arranged to receive product water from said product water outlet, a pump and a control switch responsive to said signal for activating and terminating said pump.

8. A system according to claim 1 in which the recirculation component contains packing material.

9. A system according to claim 1 further including means for fluidly coupling a portion of the waste water in the first compartment to a dual water distribution service line and/or to a hot water service line.

10. A method of desalinating water comprising the steps of:

flowing municipal water under pressure into a first compartment of a rigid tank having a second product water compartment separated from the first compartment by a flexible bladder;

flowing water from said first compartment into a first chamber of a water treatment unit divided into first and second chambers by a water permeable element that rejects and/or absorbs salts and minerals from the water to form waste water in the first chamber and desalinated product water in the second chamber;

flowing the product water from the second chamber into the second compartment, flowing waste water into the first compartment;

connecting the first compartment to a utilization appliance by means of a utilization line;

connecting the second compartment to a second utilization line;

periodically flowing supply water under pressure into the first compartment to mix with and dilute said waste water its inlets and its outlets being constructed and arranged such that in response to water being periodically removed from the first compartment, municipal said water is caused to enter the first compartment and mix with dilute waste water to form utilization water which enters said utilization line and said municipal water pressurizes the product water in said second compartment and periodically using the product water in the second utilization line.

11. A method according to claim 10 in which the waste water output from the first chamber of the water treatment unit is recycled to the first compartment to form a water treatment loop.

12. A method according to claim 10 in which the supply water is directly connected to said first compartment of said water treatment unit.

13. A method according to claim 10 in which the water treatment is conducted periodically in response to the volume of water present in a product water tank arranged to receive the product water.

14. A method according to claim 10 further including a body of packing elements disposed within the first compartment.

15. A method according to claim 14 in which a portion of the waste water is flowed into a dual water distribution service line or a hot water service line.

* * * * *